United States Patent [19]
Kaplan

[11] Patent Number: 6,144,462
[45] Date of Patent: *Nov. 7, 2000

[54] ENHANCEMENT OF A FASCIMILE MACHINE FOR FLEXIBLE NOTIFICATION OF A FACSIMILE SENDER

[75] Inventor: Alan Edward Kaplan, Morris Township, Morris County, N.J.

[73] Assignee: AT&T Corp, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/956,464

[22] Filed: Oct. 23, 1997

[51] Int. Cl.[7] .............................. H04N 1/00; H04M 11/00
[52] U.S. Cl. .................... 358/405; 358/439; 379/100.06; 379/100.14
[58] Field of Search ..................................... 358/434, 440, 358/402, 403, 404, 405, 407, 442, 439; 379/100.06, 100.09, 100.01, 100.05, 100.14, 88.12, 88.13, 88.15

[56] References Cited

U.S. PATENT DOCUMENTS

| | | | |
|---|---|---|---|
| 4,847,891 | 7/1989 | Kotani | 379/88 |
| 4,994,926 | 2/1991 | Gordon et al. | 358/400 |
| 5,090,049 | 2/1992 | Chen | 379/100 |
| 5,091,790 | 2/1992 | Silverberg | 358/434 |
| 5,127,047 | 6/1992 | Bell et al. | 379/100 |
| 5,140,439 | 8/1992 | Tanaka | 358/405 |
| 5,155,601 | 10/1992 | Toyama | 358/401 |
| 5,404,231 | 4/1995 | Bloomfield | 358/400 |
| 5,644,404 | 7/1997 | Hashimoto et al. | 358/402 |

OTHER PUBLICATIONS

Prior art Dialog search results including abstracts of JP 08179970, JP 08139895, JP 08009052, JP 07058899, JP 6062125 (Publication), RD 343043, JP 3274860 (Publication).

*Primary Examiner*—Kimberly A. Williams

[57] ABSTRACT

A fax machine that allows the user to input any of a specified time, a specified manner, a specified place, or a specified condition for notification of the result of an attempt to fax a document on the fax machine. The user specifies any of the time, manner, place, and condition for notification by either entering a user ID, by modifying default parameters, or by specifying any of these parameters for notification. The fax machine determines the result of the attempt to fax a document on the fax machine, and notifies the user according to any specified time, specified place, specified manner, or specified condition as input by the user.

18 Claims, 2 Drawing Sheets

ENHANCEMENT OF A FASCIMILE MACHINE FOR FLEXIBLE NOTIFICATION OF A FACSIMILE SENDER

TECHNICAL FIELD

This invention relates to facsimile (fax) machines, and more particularly, to a fax machine that notifies the user who is attempting to send a document via the fax machine of the result of this attempt according to any of a specified time, a specified manner, a specified place, or a specified condition for notification as input by the user.

BACKGROUND OF THE INVENTION

Fax machines are now a prevalent part of the office environment since fax machines transmit text and figures in a convenient and quick manner. A sender who is attempting to use the fax machine to transmit a document may need to be notified of the result of this attempt. A conventional fax machine may print a transmittal report summarizing the result of an attempt to send a document via that fax machine.

If the attempt is successful, the report will print that the document has been sent, and will print the time and date of completion in sending that document. If the attempt is unsuccessful, the report will print that the document has not been sent, and the report may include a reason for the failure such as "the receiving fax machine did not answer" for example.

Although the fax machine of the prior art does notify the sender of the result of an attempt to send a document, the prior art notification is limited to the sending fax machine printing out a report at that sending fax machine. However, the sender of the faxed document may require more flexibility and control in being notified of the result. For example, a sender who is busy may not have time to wait at the fax machine to obtain a print-out of the report of the result. Thus, the sender may wish to be notified at another location and at a later specified time. For example, the sender may be faxing a document later in the day, and may wish to be notified at home.

Furthermore, the sender of the faxed document may desire to be notified in a specified manner. In addition to a report simply printing out at the sending fax machine, the user may wish to be notified via E-mail at a computer, or via pager, voice mail, or another fax machine. Additionally, the sender may desire to be notified for only certain conditions. For example, the sender may wish to be notified only if the result of faxing was successful or only if the result of faxing was unsuccessful.

SUMMARY OF THE INVENTION

Accordingly, as a primary object of the present invention, the sender of a faxed document inputs any of a specified manner, a specified time, a specified place, or a specified condition for notification of the result of an attempt to fax a document via an enhanced fax machine.

In a general aspect of the present invention, an enhanced fax machine includes a data processor that accepts from a user of the fax machine any of a specified time, a specified manner, and a specified place for notifying the user of the result of an attempt to fax a document. The data processor determines the result of the attempt to fax the document, and notifies the user of this result according to any of the specified time, the specified manner, and the specified place as input by the user. The user may also input a specified condition for such notification.

In another aspect of the present invention, the time, manner, and place for notification is a default time, a default manner, and a default place respectively. The user may leave such default parameters or may override any of the default time, the default manner, and the default place with a specified time, a specified manner, and a specified place respectively.

The present invention can be used to particular advantage when a user ID along with a respective time, manner, place, and condition for notification is stored in a memory for each of a plurality of users. When the user is ready to fax a document, the user enters a user ID and that user is notified of the result of the attempt to fax the document according to the respective time, manner, place, and condition for notification corresponding to the user ID.

These and other features and advantages of the present invention will be better understood by considering the following detailed description of the invention which is presented with the attached drawings.

DETAILED DESCRIPTION

Figure 1:
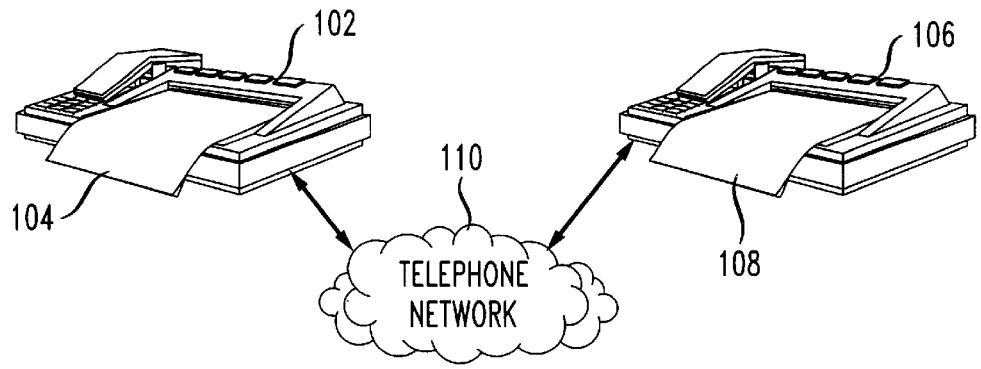
FIG. 1 shows a connection between a sending fax machine and a receiving fax machine.

Referring to FIG. 1, a sending fax machine 102 is faxing a sent document 104 to a receiving fax machine 106 that is receiving a received document 108. The received document 108 corresponds to the sent document 102, and this document is sent via a telephone network 110. However, the present invention can be used to particular advantage when the sending fax machine 102 scans the sent document 104 independently of transmitting that document over the telephone network 110.

The user of the sending fax machine 102 when sending an important document where the time or date of faxing is significant may wish to be notified of the result of faxing the document 104. Because of the importance of being notified of this result, the user may greatly appreciate flexibility for being notified of this result. More specifically, the user may appreciate being able to specify any of a time, place, manner, and condition for notification.

Figure 2:
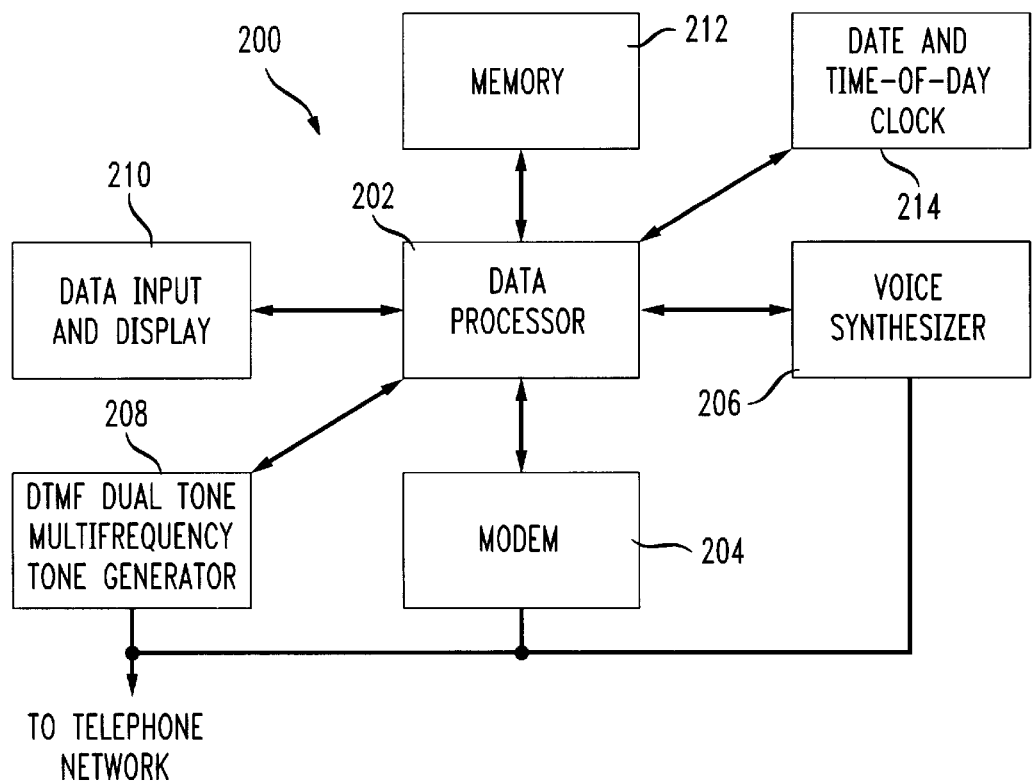
FIG. 2 shows components of an enhanced fax machine according to a preferred embodiment of the present invention.

Thus, the sending fax machine 102 is enhanced to allow for such flexibility in thus notifying the user of the result of an attempt to fax the document 104. Referring to FIG. 2, components 200 of such an enhanced fax machine include a data processor 202 which is coupled to a modem 204, a voice synthesizer 206, a DTMF (Dual Tone Multi-Frequency) tone generator 208, a data input and display 210, a memory 212, and a date and time-of-day clock 214. The modem 204, the voice synthesizer 206, and the DTMF tone generator 208 are coupled to the telephone network 110 of FIG. 1.

The operation of the enhanced fax machine 102 according to a preferred embodiment of the present invention is described with reference to FIG. 3. Operation begins when a user of the enhanced fax machine 102 attempts to fax a document via this enhanced fax machine 102. The memory 212 of this enhanced faxed machine may include user ID's for possible users of this fax machine. In that case, the user may enter a user ID corresponding to that user via the data input and display 210 (step 302 of FIG. 3).

Figure 4:
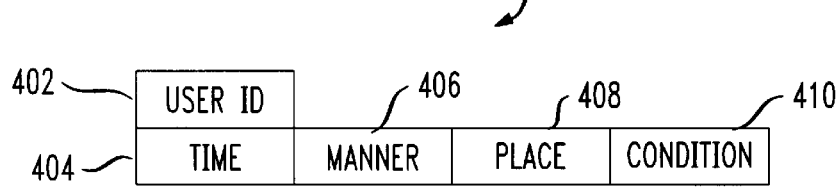
FIG. 4. shows example data fields within the memory component of FIG. 2.

User ID's would tend to be used in fax machines that are in an office environment having many users of that fax machine. In the case the user enters a user ID, the data processor 202 retrieves any of a respective time, manner, place, and condition for notification corresponding to that user ID from memory 212 (step 304 of FIG. 3). Such data may be stored in memory 212 according to a data field structure 400 of FIG. 4. This structure 400 includes a first data field 402 for storing a user ID, a second data field 404 for storing any specified time for notification of the user, a third data field 406 for storing any specified manner for notification of the user, a fourth data field 408 for storing any specified place for notification of the user, and a fifth data field 410 for storing any specified condition for notification of the user.

The time for notification specifies a time when the user wishes to be notified of the result of an attempt to fax a document. The time for notification may also include a time range for notification such as 6:00 PM to 11:00 PM. The manner for notification specifies in what manner the user wishes to be notified of this result. For example, the user may wish to be notified via E-mail at a computer, or via pager, voice mail, or another fax machine. The place for notification specifies a phone number or an E-mail address where the user wishes to be notified. The condition for notification specifies under what circumstances the user wishes to be notified. For example, the user may wish to be notified only in the case of a successful result of faxing the document or only in the case of a failure.

In an alternative embodiment of the present invention, any one user may have a plurality of user ID's with each such user ID corresponding to a respective set of notification parameters. With a plurality of user IDs, a user may easily pick any set of notification parameters that indicate the desired time, manner, place, and condition for notification simply by entering a user ID corresponding to those parameters.

Figure 3:
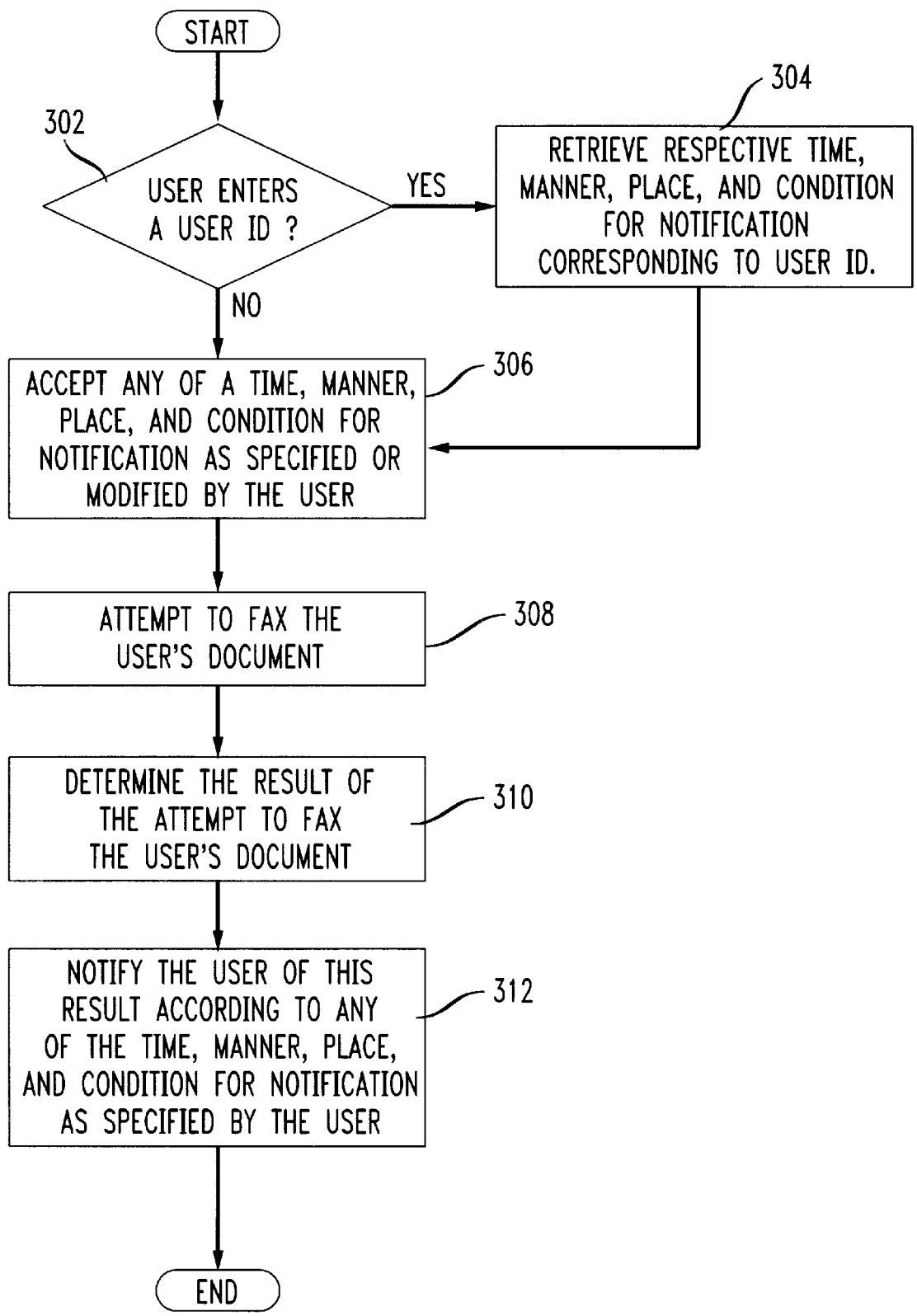
FIG. 3 shows a flowchart of the operation of the enhanced fax machine of FIG. 2 according to a preferred embodiment of the present invention.

In the case the user does not have a user ID, the user specifies any of a time, manner, place, and condition for notification via the data input and display 210 (step 306 of FIG. 3). In an alternative embodiment, the enhanced fax machine 102 of the present invention includes a default time, a default manner, and a default place for notification as set at the factory for manufacturing the enhanced fax machine 102. For example, the default parameters may include printing out a transmittal report at the enhanced fax machine 102 soon after the attempt to fax a document. The user may choose to leave such default parameters for notification, or the user may override any such default parameters via the data input and display 210 by inputting any of a specified time, a specified manner, and a specified place for notification instead (at step 306 of FIG. 3). In either case, the user may also specify a condition for notification.

Even in the case the user has entered a user ID, the user may modify any of the respective time, manner, place, and condition for notification as retrieved from memory 212 via the data input and display 210 (at step 306 of FIG. 3).

The user may additionally enter a respective identification tag for a faxed document. Each respective identification tag uniquely identifies each faxed document in the notification of the attempt to fax that document.

The data processor 202 then attempts to send the user's document via the modem 204 (at step 308 of FIG. 3) as is conventionally known to one of ordinary skill in the art of fax machine design. The data processor 202 attempts to determine the result of this attempt to fax the user's document (at step 310 of FIG. 3) as is conventionally known to one of ordinary skill in the art of fax machine design.

With this result determined, the enhanced fax machine notifies the user according to any of the specified time, manner, place, and condition for notification as input by the user (at step 312 of FIG. 3). In the case the user has specified the manner of notification to be via E-mail, the data processor 202 retrieves a text message summarizing the result of faxing and sends this text as an E-mail via either a dial-up (using the modem 204 and the telephone network 110) or via a direct computer network connection to the E-mail address specified by the user.

In the case the user has specified the manner of notification to be via a pager, the data processor 202 dials the specified pager number via the DTMF tone generator 208 and the telephone network. A text message, retrieved from the memory 212 and summarizing the result of the faxing, is sent to this pager number.

In the case the user has specified the manner of notification to be via telephone, the data processor 202 dials the specified telephone number via the DTMF tone generator 208 and the telephone network. A voice message, retrieved from the memory 212 and summarizing the result of the faxing, is generated by the voice synthesizer 206 and played to the user via the telephone network 110.

In the case the user has specified the manner of notification to be via another fax machine, the data processor 202 dials the specified fax number via the DTMF tone generator 208 and the telephone network. A text message, retrieved from the memory 212 and summarizing the result of the faxing, is sent via modem 204 to the other specified fax machine.

In an alternative embodiment, the user may specify a plurality of such manners, and further specify a priority of such manners for notification. For example, the user may specify a first notification via telephone then another notification via E-mail. Alternatively, the user may specify a manner for notification depending on the condition for notification. For example, the user may specify a first notification via phone if the attempt of faxing is unsuccessful and a different notification via E-mail if the attempt of faxing is successful.

The user may be notified in any of these manners at a time specified by the user. The date and time-of-day clock 214 keeps track of time accurately, and the notification is sent out at the time specified by the user. The clock 214 may include battery back-up or a time of day receiver such as a GPS (Global Positioning System) receiver or a WWV receiver for keeping track of date and time-of-day even in the event of a power outage. Furthermore, the user may be notified within a range of time periods such as between 6:00 PM and 11:00 PM.

In addition, the data processor 202 keeps track of the condition for notifying the user and notifies the user only when this condition is satisfied. Thus, the user may be notified only if the result of attempting to fax the document was a failure, for example.

In this manner, the enhanced fax machine of the present invention provides great flexibility to a user for providing notification of the result of an attempt to fax a document. The user has control over any of time, manner, place, and condition for notification.

In an alternative embodiment of the present invention, the user may specify any of a plurality of times, a plurality of manners, a plurality of places, and a plurality of conditions for notification. The enhanced fax machine of the present invention would notify the user according to any combination of one of more such parameters.

The forgoing is by way of example only and is not intended to be limiting. For example, the advantageous features of the present invention may be used in conjunction with other features of a fax machine. For example, the content of the user's notification may include an access time when a recipient of the faxed document has accessed the document at a receiving fax machine that stores such received documents until such an access time. This notification feature is described in more detail in commonly-owned, copending U.S. application Ser. No. 08/956,465 entitled "Method and Apparatus for Notifying a Sender of a Faxed Document when a Recipient has Accessed the Faxed Document," filed concurrently herewith and which is incorporated herein by reference.

In addition, the time, manner, place, and condition for notification as described herein are by way of example only and may further include any other possibilities and combinations of one or more such parameters. The invention is limited only as defined in the following claims and equivalents thereof.

I claim:

1. An enhanced sending fax machine that notifies a user of said sending fax machine of a result of an attempt to fax a document by said sending fax machine, said enhanced sending fax machine comprising:

means for accepting from said user of said sending fax machine, any of a specified time, a specified manner, a specified place, and a specified condition for notifying said user;

a data processor for determining the result of the attempt to fax said document; and means for notifying said user of said result according to said any of specified time, specified manner, a specified place, and specified condition for notification as input by said user, wherein said data processor notified the user of the result during a time range.

2. An enhanced sending fax machine that notifies a user of said sending fax machine of a result of an attempt to fax a document by said sending fax machine, said enhanced sending fax machine comprising:

means for accepting from said user of said sending fax machine, any of a specified time, a specified manner, a specified place, and a specified condition for notifying said user;

a data processor for determining the result of the attempt to fax said document; and means for notifying said user of said result according to said any of specified time, specified manner, specified place, and specified condition for notification as input by said user, wherein said data processor notifies the user of the result via a preferred order of a plurality of manners.

3. An enhanced sending fax machine that notifies a user of said sending fax machine of a result of an attempt to fax a document by said sending fax machine, said enhanced sending fax machine comprising:

means for accepting from said user of said sending fax machine, any of a specified time, a specified manner, a specified place, and a specified condition for notifying said user;

a data processor for determining the result of the attempt to fax said document; and means for notifying said user of said result according to said any of specified time, specified manner, specified place, and specified condition for notification as input by said user, wherein said data processor notifies the user at a plurality of places.

4. A method for notifying a user of a sending fax machine of a result of an attempt to fax a document, said method including steps of:

A. accepting from said user and storing in a memory of said sending fax machine any of a time, a manner, and a place for notifying said user;

B. attempting to fax said document;

C. determining the result of the attempt to fax said document; and

D. notifying said user of said result according to said any of said time, manner, and place, wherein said time, said manner, and said place are a default time, a default manner, and a default place respectively, wherein said user overrides any of said default time, said default manner, and said default place with a specified time, a specified manner, and a specified place respectfully.

5. A method for notifying a user of a sending fax machine of a result of an attempt to fax a document, said method including steps of:

accepting from said user and storing in a memory of said sending fax machine any of a user specified time, a user specified manner, and a user specified place for notifying said user;

attempting to fax said document;

determining the result of the attempt to fax said document;

notifying said user of said result according to said any of said user specified time, manner, and place;

storing a respective user ID and any of a respective time, manner, and place for notification for each of a plurality of users of said fax machine;

accepting a respective user ID from a user of the fax machine before attempting to fax said user's document; and notifying said user of said result according to said any of the respective time, manner, and place for notification corresponding to said user ID.

6. An enhanced sending fax machine that notifies a user of said sending fax machine of a result of an attempt to fax a document by said sending fax machine, said enhanced sending fax machine comprising:

means for accepting from said user of said sending fax machine, any of a specified time, a specified manner, a specified place, and a specified condition for notifying said user;

a data processor for determining the result of the attempt to fax said document; and means for notifying said user of said result according to said any of specified time, specified manner, specified place, and specified condition for notification as input by said user, wherein said data processor notifies the user for a plurality of conditions for notification.

7. A method for notifying a user of a sending fax machine of a result of an attempt to fax a document, said method including steps of:

accepting from said user and storing in a memory of said sending fax machine any of a user specified time, a user specified manner, and a user specified place for notifying said user;

attempting to fax said document;

determining the result of the attempt to fax said document; and notifying said user of said result according to said any of said user specified time, manner, and place, wherein said user specifies a time range for said notification.

8. A method for notifying a user of a sending fax machine of a result of an attempt to fax a document, said method including steps of:

accepting from said user and storing in a memory of said sending fax machine any of a user specified time, a user specified manner, and a user specified place for notifying said user;

attempting to fax said document;

determining the result of the attempt to fax said document; and notifying said user of said result according to said any of said user specified time, manner, and place, wherein said user specifies a preferred order of a plurality of manners for said notification.

9. A method for notifying a user of a sending fax machine of a result of an attempt to fax a document, said method including steps of:

accepting from said user and storing in a memory of said sending fax machine any of a user specified time, a user specified manner, and a user specified place for notifying said user;

attempting to fax said document;

determining the result of the attempt to fax said document; and notifying said user of said result according to said any of said user specified time, manner, and place, wherein said user specifies a plurality of places for said notification.

10. A method for notifying a user of a sending fax machine of a result of an attempt to fax a document, said method including steps of:

accepting from said user and storing in a memory of said sending fax machine any of a user specified time, a user specified manner, and a user specified place for notifying said user;

attempting to fax said document;

determining the result of the attempt to fax said document; and notifying said user of said result according to said any of said user specified time, manner, and place, wherein said user specifies a plurality of conditions for said notification.

11. A method for notifying a user of a sending fax machine of a result of an attempt to fax a document, said method including steps of:

accepting from said user and storing in a memory of said sending fax machine any of a user specified time, a user specified manner, and a user specified place for notifying said user;

attempting to fax said document;

determining the result of the attempt to fax said document; and notifying said user of said result according to said any of said user specified time, manner, and place, wherein said user inputs a respective identification tag for said document.

12. An enhanced fax machine that notifies a user of said fax machine of a result of an attempt to fax a document by said fax machine, said fax machine comprising:

a data processor for determining the result of the attempt to fax said document; and a memory for storing a user ID and at least one respective time, at least one respective manner, at least one respective place, and at least one respective condition for notification of each of a plurality of users of said fax machine, wherein, said data processor includes logic to accept said user ID from said user and logic to notify the user of the result according to the respective time, manner, place, and condition for notification corresponding to the user ID.

13. A method for notifying a user of a sending fax machine of a result of an attempt to fax a document, said sending fax machine having stored therein a default time, a default manner and a default place for notifying said user, said method including steps of:

A. accepting from said user and storing in a memory of said sending fax machine any of a user specified time to override said default time, a user specified manner to override said default manner, and a user specified place to override said default place for notifying said user;

B. attempting to fax said document;

C. determining the result of the attempt to fax said document; and

D. notifying said user of said result according to said any of said user specified time, manner, and place.

14. A method for notifying a user of a sending fax machine of a result of an attempt to fax a document, said method including the steps of:

storing a user ID and at least one respective time, at least one respective manner, at least one respective place, and at least one respective condition for notification of each of a plurality of users of said sending fax machine;

accepting the user ID from said user before attempting to fax said document; and notifying said user of said result according to the respective time, manner, place, and condition for notification corresponding to said user ID.

15. A method for notifying a user of a sending fax machine of a result of an attempt to fax a document, said sending fax machine having stored therein a default condition for notifying said user, said method including steps of:

A. accepting from said user and storing in a memory of said sending fax machine a user specified condition for notifying said user to override said default condition;

B. attempting to fax said document;

C. determining the result of the attempt to fax said document; and

D. notifying said user of said result according to said user specified condition.

16. An enhanced sending fax machine that notifies a user of said sending fax machine of a result of an attempt to fax a document by said sending fax machine, said enhanced sending fax machine comprising:

means for accepting from said user of said sending fax machine, any of a specified time entered by said user to override a default time, a specified manner entered by said user to override a default manner, a specified place entered by said user to override a default place, and a specified condition entered by said user to override a default condition for notifying said user;

a data processor for determining the result of the attempt to fax said document; and means for notifying said user of said result according to said any of specified time, specified manner, specified place, and specified condition for notification as input by said user.

17. An enhanced fax machine that notifies a user of said sending fax machine of a result of an attempt to fax a document by said sending fax machine, said enhanced sending fax machine comprising:

means for accepting from said user of said sending fax machine, any of a specified time, a specified manner, a specified place, and a specified condition for notifying said user;

a data processor for determining the result of the attempt to fax said document; and means for notifying said user of said result according to said any of specified time, specified manner, specified place, and specified condition for notification as input by said user, wherein said time, said manner, and said place for notification are a default time, a default manner and a default place respectively, wherein said user overrides any of said default time, said default manner, and said default place with a specified time, a specified manner and a specified place respectively.

18. An enhanced fax machine that notifies a user of said fax machine of a result of an attempt to fax a document by said fax machine, said enhanced fax machine comprising:

means for accepting from said user of said fax machine, any of a specified time, a specified manner, a specified place, and a specified condition for notifying said user;

a data processor for determining the result of the attempt to fax said document;

means for notifying said user of said result according to said any of specified time, specified manner, specified place, and specified condition for notification as input by said user; and a memory for storing a respective user ID and any of a respective time, manner, place, and condition for notification for each of a plurality of users of said fax machine; and wherein, said data processor accepts a respective user ID from a user of the fax machine and notifies said user of the result according to any of the respective time, manner, place, and condition for notification corresponding to the respective user ID.

* * * * *

UNITED STATES PATENT AND TRADEMARK OFFICE
CERTIFICATE OF CORRECTION

PATENT NO.: 6,144,462

DATED: November 7, 2000

INVENTOR: Alan Edward KAPLAN

It is certified that an error appears in the above-identified patent and that said Letters Patent is hereby corrected as shown below:

On the front cover, in [34] the title:

The fourth word of the title "FASCIMILE" has been replaced with -- FACSIMILE --.

Signed and Sealed this

Twenty-ninth Day of May, 2001

Attest:

NICHOLAS P. GODICI

*Attesting Officer*   *Acting Director of the United States Patent and Trademark Office*